US008794080B2

(12) United States Patent
Mueller et al.

(10) Patent No.: US 8,794,080 B2
(45) Date of Patent: Aug. 5, 2014

(54) ULTRASONIC FLOW SENSOR FOR DETECTING A FLOW OF A FLUID MEDIUM

(75) Inventors: Roland Mueller, Steinheim (DE); Gerhard Hueftle, Aspach (DE); Michael Horstbrink, Stuttgart-Feuerbach (DE); Tobias Lang, Stuttgart (DE); Sami Radwan, Stuttgart (DE); Bernd Kuenzl, Schwieberdingen (DE); Roland Wanja, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 13/501,393

(22) PCT Filed: Aug. 18, 2010

(86) PCT No.: PCT/EP2010/062046
§ 371 (c)(1),
(2), (4) Date: Jun. 28, 2012

(87) PCT Pub. No.: WO2011/045107
PCT Pub. Date: Apr. 21, 2011

(65) Prior Publication Data
US 2012/0285260 A1 Nov. 15, 2012

(30) Foreign Application Priority Data

Oct. 13, 2009 (DE) .......................... 10 2009 045 620

(51) Int. Cl.
*G01F 1/66* (2006.01)
(52) U.S. Cl.
USPC ....................................... 73/861.27
(58) Field of Classification Search
USPC ......................... 73/861.27–861.29
See application file for complete search history.

(56) References Cited

U.S. PATENT DOCUMENTS

| 5,363,848 | A  | * | 11/1994 | Spani et al. ................... 600/455 |
| 6,343,511 | B1 | * | 2/2002  | Lynnworth et al. ............. 73/644 |
| 6,345,539 | B1 | * | 2/2002  | Rawes et al. ............... 73/861.27 |
| 6,550,345 | B1 | * | 4/2003  | Letton ........................ 73/861.27 |
| 7,810,399 | B2 | * | 10/2010 | van Klooster et al. ..... 73/861.31 |

FOREIGN PATENT DOCUMENTS

| DE | 40 10 148      | 10/1991 |
| DE | 43 36 370      | 2/1995  |
| DE | 10 2004 013 249 | 10/2005 |
| DE | 10 2004 061 404 | 7/2006  |
| DE | 10 2006 023 479 | 11/2007 |

(Continued)

OTHER PUBLICATIONS

International Search Report for PCT/EP2010/062046, dated Nov. 19, 2010.

*Primary Examiner* — Jewel V Thompson
(74) *Attorney, Agent, or Firm* — Kenyon & Kenyon LLP

(57) ABSTRACT

An ultrasonic flow sensor for detecting a flow of a fluid medium in a flow tube includes at least one first ultrasonic transducer, at least one second ultrasonic transducer, and at least one waveguide configured to conduct ultrasonic waves between the at least one first ultrasonic transducer and the at least one second ultrasonic transducer by reflection on walls of the waveguide, and to enable the fluid medium to flow through. The ultrasonic waves are able to propagate between the first ultrasonic transducer and the second ultrasonic transducer on at least two ultrasonic paths. Sound energies of the ultrasonic waves transmitted on the at least two different ultrasonic paths differ from one another by no more than a factor of 100.

13 Claims, 5 Drawing Sheets

(56) References Cited

FOREIGN PATENT DOCUMENTS

| | | |
|---|---|---|
| DE | 10 2006 041 530 | 3/2008 |
| FR | 2 776 379 | 9/1999 |
| JP | 2002-148085 | 5/2002 |
| JP | 2007-139610 | 6/2007 |
| JP | 2008-128727 | 6/2008 |
| JP | 2009-014611 | 1/2009 |

\* cited by examiner

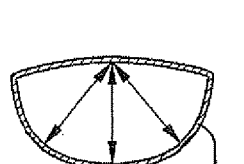 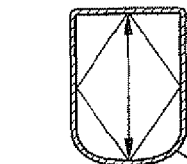 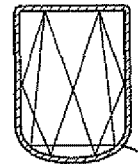 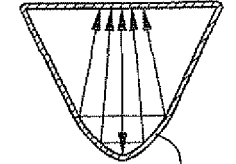
FIG. 13A  FIG. 13B  FIG. 13C  FIG. 13D
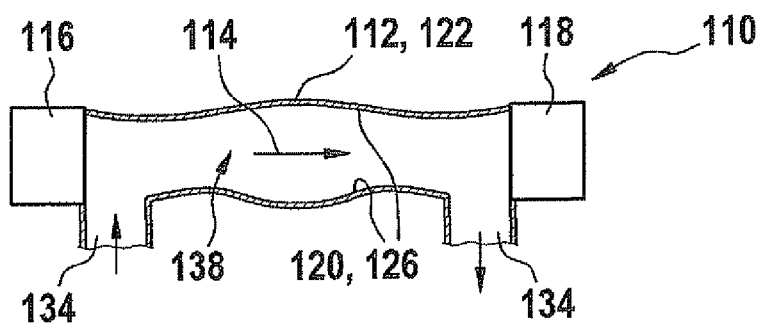
FIG. 14
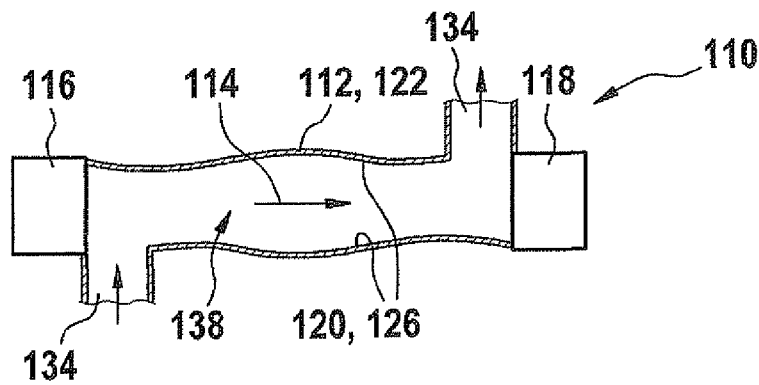
FIG. 15
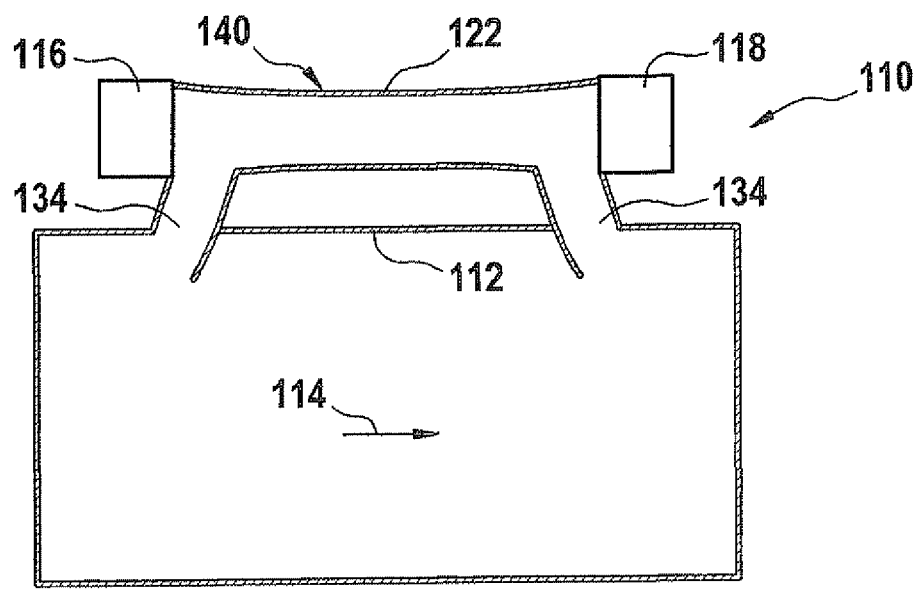
FIG. 16

ULTRASONIC FLOW SENSOR FOR DETECTING A FLOW OF A FLUID MEDIUM

BACKGROUND OF THE INVENTION

1. Field of the Invention

The present invention relates to an ultrasonic flow sensor for detecting a flow of a fluid medium in a flow tube.

2. Description of Related Art

Ultrasonic flow meters based on at least two ultrasonic transducers which are offset in a flow tube in the flow direction and which mutually send ultrasonic signals via at least one reflective surface are known from the related art. Examples of these types of ultrasonic sensors are described in published German patent application documents DE 10 2004 061 404, DE 10 2006 023 479 A1, DE 40 10 148 A1, or DE 10 2006 041 530 A1. Therefore, reference may be made to these publications for possible designs of the ultrasonic transducers and possible measuring principles. For example, sound propagation is accelerated in a flow direction of a fluid medium and retarded in a direction opposite the flow direction. By measuring the ultrasonic propagation time in both directions, the influence of the sound velocity may be compensated for, and the flow rate may be ascertained independently of this sound velocity, which in the case of a gas as the flowing medium is a function primarily of the temperature and the gas composition (for example, the atmospheric humidity), and to a lesser extent, also of the pressure.

Measuring systems are known from the related art in which a reflector may be integrated into a tube wall, or may also be attached to a sensor module, so that, together with the ultrasonic transducers and an electronics system, a type of plug-in sensor results. In this regard, reference may be made to published German patent application document DE 10 2004 061 404 A1, for example. Likewise, multiple nonparallel reflective surfaces may be used in order to detect a larger portion of the flow due to the resulting ultrasonic path. In this regard, reference may be made to published German patent application document DE 43 36 370 C1, for example. Furthermore, a tubular screening of an ultrasonic path with respect to a flowing medium is proposed in published German patent application document DE 10 2006 041 530 A1. The tubular screening is situated in such a way that a tube is oriented in the area of one of the two ultrasonic transducers in such a way that a portion of the transmission path of the ultrasonic wave is guided in this tube. The tube is closed off by one of the ultrasonic transducers, and therefore the ultrasonic propagation distance inside the tube is not part of a measuring segment through which flow passes.

Published German patent application document DE 10 2006 023 479 A1 proposes a curved reflective surface in which the sound is focused toward the respective other ultrasonic transducer, thus compensating for the drift of this ultrasonic wave. This is to be carried out in such a way that drifted beam components reach a reflector section having a different inclination, and as a result of this changed inclination are still deflected to the same or a similar reception point. The reflective surface described in published German patent application document DE 10 2006 023 479 A1 is attached in a flow tube or to a sensor module which also accommodates the ultrasonic transducers. A similar system is also described in published German patent application document DE 10 2004 061 404 A1. In addition, reflective surfaces which sometimes have convex curvatures are known.

However, the ultrasonic sensors known from the related art have a plurality of technical challenges. These result in particular from the fact that different components of the ultrasonic signals are transmitted differently for various flow rates of the fluid medium. Thus, the method described in published German patent application document DE 10 2006 023 479 A1, for example, is based on focusing on and simultaneous compensation for drift of the ultrasonic waves. In practice, however, this compensation is difficult, since different degrees of turbulence and velocity profiles generally form, depending on the flow rate in the flow tube, so that genuine compensation for the drift is possible only in part. In addition, even with full compensation, the reception signal contains ultrasonic components based on different emission and detection angles, depending on the flow rate, which for customary ultrasonic transducers always have slightly different transmission functions. These differences may result in signal distortions, which in particular at higher flow rates significantly hinder unambiguous propagation time measurement. Heretofore, it has been possible to remedy this only by making predictions for the future, at least in principle, based on multiple flow measurements from the past. On the one hand, these predictions are very complicated, and on the other hand may fail when there are interferences or rapid changes in the flow rate.

BRIEF SUMMARY OF THE INVENTION

Therefore, an ultrasonic flow sensor is proposed which at least largely avoids the disadvantages of known ultrasonic flow sensors. The ultrasonic flow sensor is used for detecting a flow of a fluid medium in a flow tube. The ultrasonic sensor may be used, for example, in an ultrasonic air mass meter (ultrasonic flow meter (UFM)), for example in the automotive sector or in other technology sectors, the natural sciences, or medical technology. The fluid medium may, for example, be a liquid or a gas, for example air. Accordingly, the flow tube may, for example, be a flow tube of an air intake and/or an exhaust tract of an internal combustion engine.

The ultrasonic flow sensor includes at least one first ultrasonic transducer and at least one second ultrasonic transducer, as well as at least one waveguide, the waveguide being designed to conduct ultrasonic waves between the at least one first ultrasonic transducer and the at least one second ultrasonic transducer (or vice versa, by inference) by reflection on the walls of the waveguide, preferably at least partially by multiple reflection. The waveguide is designed for the fluid medium to flow through.

Within the scope of the present invention, a waveguide is generally understood to mean an at least partially closed-off tubular section or channel which has at least one reflective surface at which the reflections, preferably the multiple reflections, may take place. Accordingly, the waveguide may also be referred to or designed as a channel-like reflection and/or guide device. In particular, the waveguide may have a completely or partially channel-like design. A multiple reflection is understood to mean a reflection in which a predominant portion of the sound energy transmitted between the ultrasonic transducers follows propagation paths in which the ultrasonic waves are reflected at least twice, preferably at least three times, and particularly preferably at least four times on an at least one, preferably at least two, reflective surfaces of the waveguide. In addition to the sound components which are transmitted via reflection, in particular multiple reflection, sound components of the ultrasonic waves may also be transmitted with no reflection, without being reflected on the at least one reflective surface. A number of zero reflections are assigned to a corresponding ultrasonic path in which no reflection takes place.

According to the present invention, the ultrasonic flow sensor is set up in such a way that the ultrasonic waves are able to propagate between the first ultrasonic transducer and the second ultrasonic transducer on at least two ultrasonic paths. The ultrasonic waves are reflected on the different ultrasonic paths for different numbers of times. For example, one ultrasonic path having no reflection (number of reflections=zero), one ultrasonic path having one reflection, one ultrasonic path having two reflections, one ultrasonic path having three reflections, one ultrasonic path having four reflections, etc., may be present, or a system which has any desired selection of at least two of these ultrasonic paths, preferably three, four, or more, may be present.

This means that the ultrasonic transducers are set up based on their emission characteristic and/or their reception characteristic in such a way that at least portions of the emitted or received ultrasonic waves propagate on geometrically different ultrasonic paths. An ultrasonic path is understood to mean a geometric connection between the first ultrasonic transducer and the second ultrasonic transducer, or a group of such connections, which have a shared number of reflections on the at least one reflective surface, along which at least a portion of the ultrasound is able to propagate.

Two, three, four, or more ultrasonic paths may be provided, each having different reflections. At least two of these different ultrasonic paths, preferably three, four, or more, or all of these different ultrasonic paths, should have essentially equal priority with regard to their share in the transmission of the sound energy between the ultrasonic transducers. This means that sound energies of the ultrasonic waves transmitted on the at least two different ultrasonic paths differ from one another by no more than a factor of 100, preferably by no more than a factor of 25, and particularly preferably by no more than a factor of 4. If more than two different ultrasonic paths are provided, this condition may apply for at least two of these ultrasonic paths, for more than two of these ultrasonic paths, or even for all of these different ultrasonic paths, in each case in pairs. In general, this condition ensures that sound energy may be transmitted via more than one ultrasonic path in the ultrasonic flow sensor, the various ultrasonic paths having essentially equal priority. Thus, the ultrasonic flow sensor may be set up in particular in such a way that different ultrasonic paths having different numbers of reflections are combined, and have, at least partially, equal priority with regard to their transmission, and may contribute to signal generation of the ultrasonic flow sensor with essentially equal priority. This illustrates the waveguide effect of the waveguide, which may thus have a "collective effect" with regard to different emission components of the ultrasonic waves, for example with regard to different solid angle ranges of the emission or the reception of the ultrasonic transducers. Thus, the proposed ultrasonic flow sensor differs from the system proposed in published German patent application document DE 40 10 148 A1, for example, in which a portion of a V-shaped ultrasonic path between two ultrasonic transducers is regarded as a "parasitic" ultrasonic path compared to a W-shaped ultrasonic path, and is strongly suppressed.

Furthermore, the ultrasonic transducer should preferably be set up in such a way that the different ultrasonic paths are not just subordinate ultrasonic paths, but, rather, that preferably a significant portion of the overall sound energy should be transmitted via these at least two different ultrasonic paths or via at least two or more of these different ultrasonic paths. In other words, the combined sound energies of the ultrasonic waves transmitted via the at least two different ultrasonic paths should constitute at least 50%, preferably at least 60%, or even at least 70% of an overall sound energy transmitted between the first ultrasonic transducer and the second ultrasonic transducer. It may thus be ensured that the above-described collective effect does not refer just to subordinate ultrasonic paths, but, rather, that the important ultrasonic paths having different numbers of reflections are detected.

For example, at least two different ultrasonic paths may exist, a number of n1 reflections occurring for a first ultrasonic path, and a number of n2 reflections occurring for a second ultrasonic path, and preferably a number of n3 reflections occurring for a third ultrasonic path, etc. n1, n2, and optionally n3, n4, etc. are different non-negative integers, i.e., n1, n2, etc., are selected from the set $\{0, 1, 2, 3, \ldots\}$, and n1≠n2, etc. The sum of the sound energies of the ultrasonic components transmitted between the ultrasonic transducers via the at least two ultrasonic paths is preferably at least 50% of the sound energy.

For example, the different ultrasonic paths may be the primary ultrasonic paths, i.e., the ultrasonic paths via which the strongest ultrasonic components are transmitted.

The ultrasonic transducers may in particular be set up to emit and/or detect wave packets essentially within an angular range of primary sound beams. In this regard, "essentially" is understood to mean a design in which at least 90%, preferably greater than 95%, of the sound energy is emitted within the angular range of the primary sound beams. The ultrasonic flow sensor is preferably set up in such a way that different transmission functions may be associated with sound components within the primary sound beams, as a function of an emission angle. The waveguide is preferably set up in such a way that the sound components of one ultrasonic transducer are deflected to the respective other ultrasonic transducer, and vice versa, the sound components which differ with respect to the emission angle and the transmission function preferably being detected.

The first ultrasonic transducer and the second ultrasonic transducer may be situated essentially symmetrically with respect to the waveguide. This means that the propagation distances of the ultrasonic signals, apart from the flow of the fluid medium, preferably do not differ, or differ only negligibly, in an emission direction from the first ultrasonic transducer toward the second ultrasonic transducer, and vice versa. In contrast, as stated above, tubular screening of an ultrasonic path is disclosed in published German patent application document DE 10 2006 041 530 A1 which is intentionally selected to be asymmetrical, so that similar integration via the secondary beams or off-center emission components of the two ultrasonic transducers is not able to occur as the result of reflections possibly taking place in this tube. In addition, the fluid medium does not flow through the tubular screening described in published German patent application document DE 10 2006 041 530 A1.

The waveguide may in particular include at least one channel section which is aligned essentially parallel to a main flow direction of the fluid medium. A main flow direction is in this case understood to mean a local preferred direction of the main mass or volume transport of the fluid medium at the location of the ultrasonic sensor, it being possible to disregard localized turbulence or localized deviations, for example. "Essentially parallel" may also be understood to mean a slight deviation from perfect parallelism, preferably a deviation of no greater than 20°, in particular no greater than 10°, or even no greater than 5°.

In principle, the ultrasonic waves may be coupled into the waveguide parallel to or also at an angle relative to an axis of the waveguide. If the coupling occurs at an angle relative to an axis of the waveguide, it is particularly preferred when the waveguide includes at least two lateral openings for coupling ultrasonic waves into the channel section at an angle relative to the axis of the waveguide. These openings may include, for example, circular, polygonal, or basically any desired opening cross sections, or also openings which are not completely enclosed by the material of the waveguide, i.e., for example milled recesses or cutouts in walls of the waveguide. In addition, the openings may also include one or multiple connectors which, for example, simplify installation of the ultrasonic transducers with respect to the openings. The waveguide may also have coupling elements, in particular curved coupling surfaces, in the region of the openings for deflecting ultrasonic waves. In principle, the waveguide may include one or multiple reflective surfaces. These reflective surfaces may be linear or also curved. Thus, the waveguide may in particular include at least one curved reflective surface.

As described above, a reflection, for example a multiple reflection, of the coupled ultrasonic waves takes place in the waveguide. The predominant portion of the ultrasonic waves coupled into the waveguide is preferably reflected in the waveguide, although portions may also remain without reflection. The ultrasonic flow sensor is preferably set up in such a way that ultrasonic waves coupled into the waveguide are reflected on the at least one reflective surface on at least one of the possible ultrasonic paths at least three times, and preferably at least four times or even at least five times, or more often, for example at least ten times.

The ultrasonic flow sensor may in particular be set up in such a way that the entire fluid medium does not flow through the waveguide. Thus, the ultrasonic flow sensor may in particular be set up in such a way that a first portion of the fluid medium flows through the waveguide, and at least a second portion of the fluid medium flows outside the waveguide. This system has in particular the advantage that the waveguide in the region of the ultrasonic flow sensor does not have to have, at least not completely, the same component design as the flow tube. In this way, the geometry of, for example, the ultrasonic flow sensor, the waveguide, and/or the at least one reflective surface may be selected at least largely independently of the geometry and/or the dimensions of the flow tube. This is not the case in the systems known from published German patent application document DE 43 36 370 C1 or published German patent application document DE 40 10 148 A1, for example, in which the flow tube itself is used as a reflector. Thus, according to the present invention the ultrasonic flow sensor may be used, for example, in different geometries of flow tubes. For example, flow tubes having diameters of at least 600 mm may be used. For flow tubes having such large diameters, systems in which the flow tube itself is used as a reflector are generally almost impossible to implement nowadays as the result of the scattering of the ultrasonic waves. The flow tube may have a circular, round, polygonal, or basically any desired cross section.

The ultrasonic flow sensor may in particular be designed completely or partially as a plug-in sensor, i.e., a component which is insertable into the flow tube. The plug-in capability may be reversible, so that the plug-in sensor is also removable from the flow tube. The plug-in sensor may be connected to the flow tube via a force-fit and/or form-locked and/or adhesive connection, for example. Alternatively, the ultrasonic flow sensor may be permanently connected to the flow tube.

As stated above, the waveguide itself may include one or multiple reflective surfaces, which may be linear or also curved. The waveguide may in particular have a cross section which is selected from the following cross sections: a polygonal cross section, in particular a triangular or rectangular cross section; a U-shaped cross section; a trough-shaped cross section; and a groove-shaped cross section. Various embodiments and exemplary embodiments of these cross sections are described in greater detail below.

The waveguide preferably has a design which is at least partially different from the flow tube, i.e., does not have, at least completely, the same component design as the flow tube. In particular, at least one reflective surface may be different from a wall of the flow tube. However, alternatively or additionally, the waveguide may have, at least partially, the same design as the flow tube, so that, for example, a wall of the flow tube may also be used as a wall surface, for example as a reflective surface of the waveguide.

The ultrasonic transducers may be situated in particular in a measuring segment of the flow tube which acts as a waveguide or which includes the waveguide. In particular, the measuring segment may be linear. The measuring segment may be a component of the main flow tube, or may also be completely or partially situated in a bypass. In this case, the flow of the fluid medium may, for example, be laterally coupled into the measuring segment, for example with the aid of inlets or outlets situated on the same side of the measuring segment, or inlets and outlets situated on opposite sides.

As described above, the waveguide in particular may be situated completely or partially in a main flow tube. Alternatively or additionally, however, the waveguide may be accommodated at least partially in a bypass of the flow tube, i.e., a segment within which a portion of the fluid medium flowing through the flow tube is discharged from the main flow tube and conducted through at least one secondary channel. For example, a measuring segment may be situated in this secondary channel, i.e., the bypass.

The proposed ultrasonic flow sensor has a plurality of advantages compared to known ultrasonic flow sensors and measuring principles. Thus, in the present invention, in contrast to the related art a direct focusing or targeted compensation of drift is not necessarily implemented, but, rather, without flow, the different angular components of the ultrasonic beam are intentionally taken into account and, depending on the specific embodiment selected, are statistically superimposed, in a manner of speaking, by multiple reflections. A much greater variety of different transmission functions, which outweigh the beam drift effect, thus contributes to the overall signal. Overall, this results in a more constant signal shape under the expected cross-influences, such as influences of temperature, pressure, atmospheric humidity, contamination, aging, or flow rate. The flow measuring region within which accurate and unambiguous propagation time measurement is possible may thus be greatly increased.

BRIEF DESCRIPTION OF THE DRAWINGS

FIGS. 13A through 13D show various cross sections of possible waveguides.

FIGS. 14 and 15 show various exemplary embodiments having waveguides integrated into the flow tube.

FIG. 16 shows one exemplary embodiment of an ultrasonic flow sensor in a bypass of the flow tube.

DETAILED DESCRIPTION OF THE INVENTION

Figure 1:
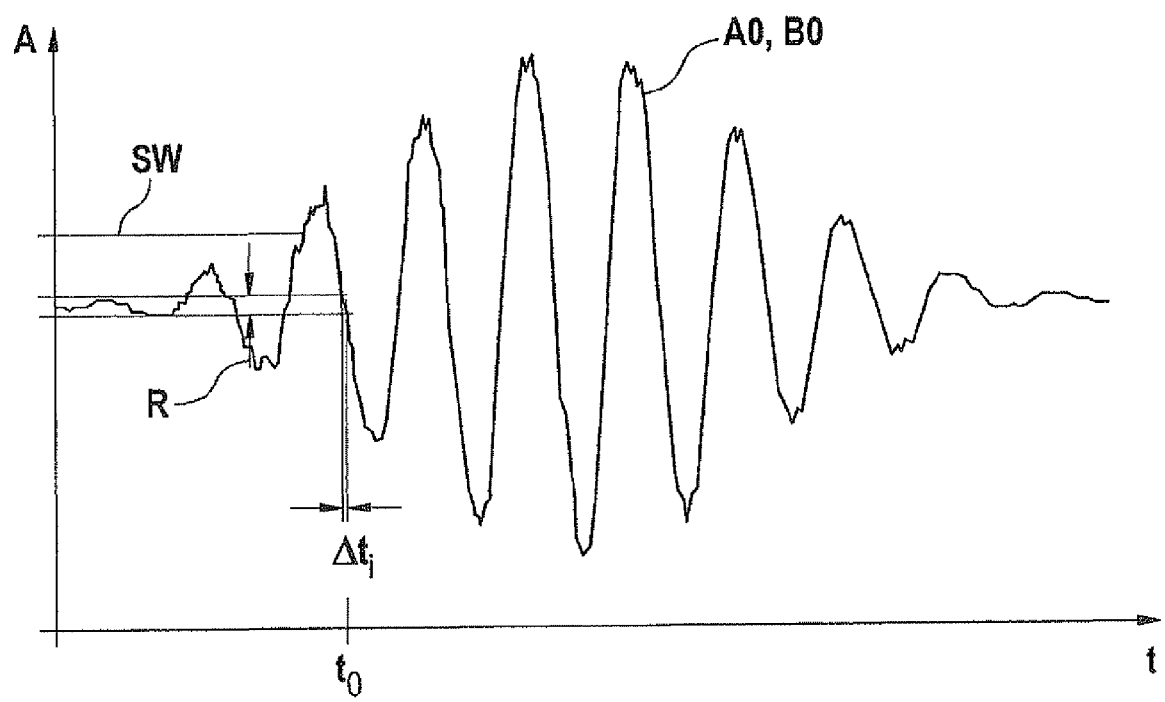
FIG. 1 shows one example of an ultrasonic wave package for a propagation time measurement.

FIG. 1 illustrates a typical ultrasonic wave package which may be used for propagation time measurement. The illustration is taken from published German patent application document DE 10 2004 013 249 A1, to which reference may be made for possible details of the ultrasonic wave package. Due to the limited bandwidth of conventional ultrasonic transducers, the transient response of the ultrasonic wave package extends over multiple ultrasonic oscillations, so that as a rule there is no natural, unequivocal time of reception. Rather, a feature must first be defined which is then to be detected as the time of reception. To achieve a high time resolution, however, the information content of the slowly ascending envelope curve of the ultrasonic signal according to FIG. 1 is generally not sufficient for this purpose. Instead, for example, a specific zero crossing of the ultrasonic signal having an appropriate greater slope may be evaluated. To obtain an unambiguous result, for example, a zero crossing point in time $t_0$ may be used after a threshold value SW is exceeded. To obtain a result which is independent of fluctuations of the signal amplitude, the threshold value may be tracked from one measurement to the next.

Alternatively, the propagation time may be determined by other methods, which, however, are ultimately always to be based on the recognition of features in the reception signal curve, and which therefore are more or less sensitive to changes in the signal shape. Such changes may be at least partially compensated for by using control processes in which at least slow changes in the shape of the reception signal curves are recognized and stored, and are taken into account in the recognition of features in the reception signals of subsequent measurements.

As a rule, however, a fundamental difficulty is that for such tracking, an initial value must first be set. If, for example, the amplitude of the reception signals, and thus also the tracked trigger threshold in FIG. 1, changes by more than the difference in amplitudes of two consecutive ultrasonic waves within the transient flank, a correct value is generally no longer obtained after the ultrasonic flow sensor is switched on again. This could be remedied by a nonvolatile RAM memory. However, the case may still occur that with increasing flow rate, the tracking moves a maximum distance away from the initial value, the ultrasonic flow sensor is switched off, and is subsequently switched back on when the medium is at rest. In this case, the tracking would still be at a value which is now incorrect for high flow rates.

Thus, in contrast to tracking, it would be advantageous to ensure from the outset with the aid of the equipment that the signal shape remains as stable as possible in all operating states and over the service life, including under all stresses, so that readjustments may be limited to a correspondingly small range. Thus, the ultrasonic flow sensor should advantageously be designed in such a way that the flow shifts the entire signal as a whole, while the shape of the signal remains stable.

One possible cause of changes in the signal shape is the emission characteristic of the ultrasonic transducers. In particular, the higher frequencies within the transducer bandwidth have a higher directivity, so that the spectrum tends toward lower frequencies as the angle with respect to the transducer axis of symmetry increases. Due to the beam drift as a result of the flow to be measured, different angular components of the emission and reception beam of the ultrasonic transducers, having correspondingly different transmission functions, contribute to a greater or a lesser extent to the overall signal as a function of the flow rate. Even if it is taken into account that the signal shape changes in the receiving-transmitting direction with the flow, as well as in the receiving-transmitting direction against the flow, and this is made use of to compensate for the corresponding changes, for example by ascertaining the propagation time difference by cross-correlation of the two reception signals, it must be taken into consideration that the change in signal shape is different in the two transmissions. The general reason is that a strictly reciprocal measuring situation is present only for an isotropic transmission medium. However, as a result of the flow the medium no longer acts isotropically, so that the corresponding symmetry is broken.

It is not possible to completely compensate for the change in the signal shape, even with the aid of a focusing reflective surface, as explained with reference to an ultrasonic flow sensor 110 according to the related art illustrated in FIG. 2. Ultrasonic flow sensor 110 may, for example, be completely or partially inserted into a flow tube 112, as indicated only by the dash-dotted line in FIG. 2, through which a fluid medium flows in a main flow direction 114. Ultrasonic flow sensor 110 includes a first ultrasonic transducer 116 and a second ultrasonic transducer 118, as well as a curved reflective surface 120. For these types of ultrasonic flow sensors 110, reference may be made, for example, to 10 2006 023 479 A1 cited above.

Figure 2:
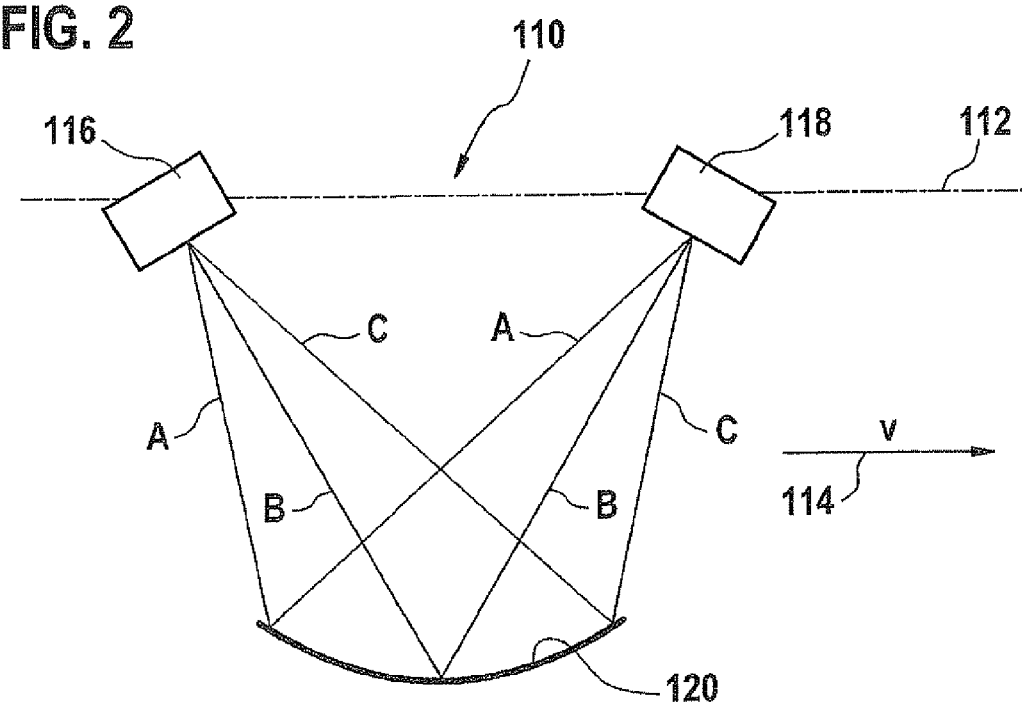
FIG. 2 shows a known ultrasonic flow sensor having a curved reflective surface.

FIG. 2 illustrates examples of different ultrasonic paths which may be traveled by ultrasonic signals between first ultrasonic transducer 116 and second ultrasonic transducer 118. These three different ultrasonic paths are denoted by the letters A, B, and C. In the case of a symmetrical orientation of ultrasonic transducers 116, 118 with respect to reflective surface 120 and with the medium at rest, all ultrasonic paths A, B, C contribute equally to the overall signal. During flow, however, ultrasonic paths B and C tend to dominate, while A has less of an effect. Central main component B emanating from first ultrasonic transducer 116 strikes second ultrasonic transducer 118, but at a different angle, so that the off-center transmission functions of second ultrasonic transducer 118 tend to contribute more. Although the amplitude is more stable over the flow measuring range, this does not necessarily apply to the signal shape. Even making an allowance by installing ultrasonic transducers 116, 118 at a certain angle which differs from the symmetrical configuration does not change the fact that some angular ranges contribute more, and others contribute less, to the overall signal as a function of the flow rate.

Figure 3A:
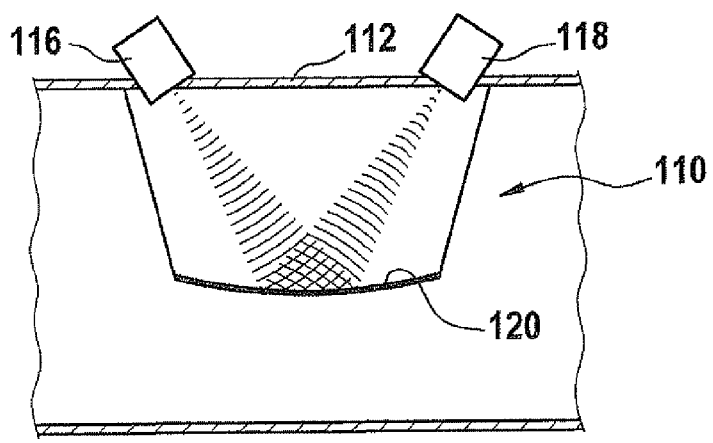
FIGS. 3A through 3D show a propagation of ultrasonic waves for curved reflective surfaces under different flow conditions.
Figure 3B:
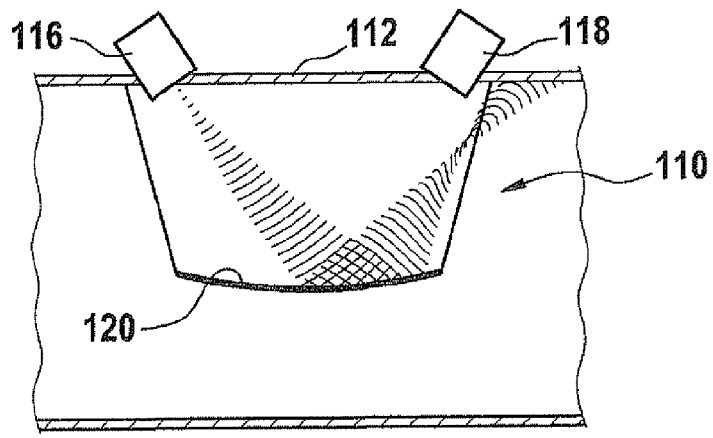
Figure 3C:
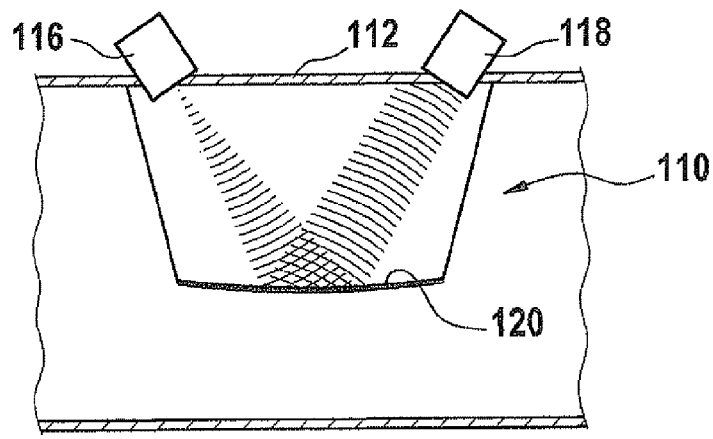
Figure 3D:
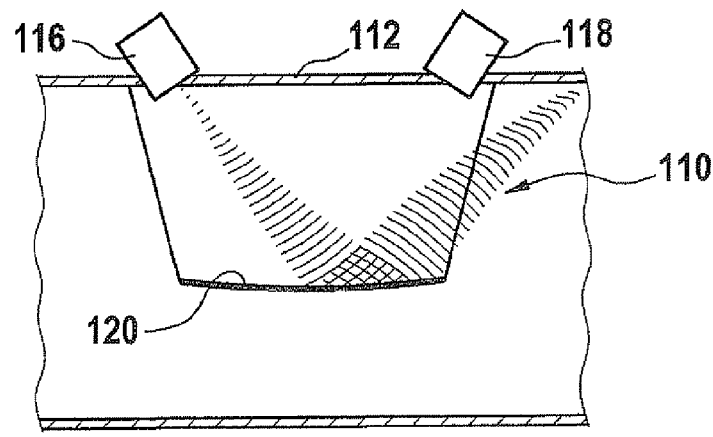

The behavior of the wave fronts of the ultrasonic signals and of the sound focusing is shown in a schematic illustration in FIGS. 3A through 3D. FIG. 3A illustrates a situation in which the curvature of reflective surface 120 has been selected in such a way that under steady-state flow, the ultrasonic waves are focused by one ultrasonic transducer 116, 118 onto the respective other ultrasonic transducer. If a flow now occurs which has a certain velocity profile in flow tube 112, the focus migrates not only in the flow direction, but also with a component transverse thereto (see FIG. 3B). In contrast, in FIG. 3D the curvature of reflective surface 120 has been reduced to such an extent that, at the same flow rate and with the same flow profile as in FIG. 3B, the ultrasonic signals are focused at least on the wall of flow tube 112, although too far downstream from second ultrasonic transducer 118. When the flow comes to rest again, as illustrated in FIG. 3C, the curvature of reflective surface 120 is no longer sufficient for complete focusing.

Figure 4:
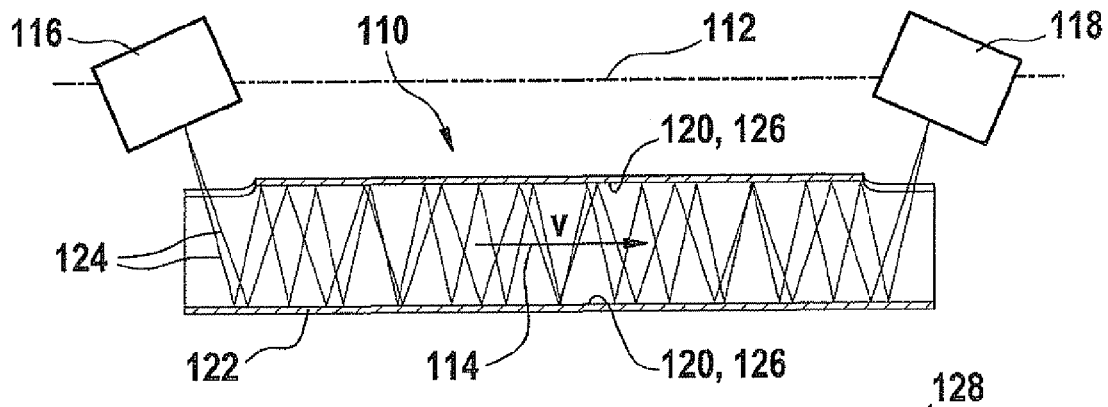
FIG. 4 shows a first exemplary embodiment of the ultrasonic flow sensor according to the present invention.

On the other hand, FIG. 4 illustrates one exemplary embodiment of an ultrasonic flow sensor 110 according to the present invention. This ultrasonic flow sensor 110 is once again completely or partially inserted into a flow tube 112, as indicated once again only by the dash-dotted line in FIG. 4. Ultrasonic flow sensor 110 may also be completely or partially integrated into a wall of flow tube 110, or may incorporate the tube wall. In contrast to known ultrasonic flow sensors, ultrasonic flow sensor 110 according to FIG. 4 includes a waveguide 122 which is designed as a channel-like reflection and/or guide device. Waveguide 122 is set up to conduct the ultrasonic signals from one of ultrasonic transducers 116, 118 to the respective other ultrasonic transducer via a plurality of reflections. An opening cross section of waveguide 122 and a distance from ultrasonic transducers 116, 118 may be designed in such a way that the angular range of ultrasonic transducers 116, 118 which contributes to the overall signal due to the expected flow measuring range, and within which the transmission function is significantly changed, is detected. Depending on the flow rate or the beam drift, different angular components contribute to the overall signal via different numbers of reflections. Accordingly, the ultrasonic flow sensor is set up in such a way that the ultrasonic waves may be transmitted between ultrasonic transducers 116, 118 on at least two different ultrasonic paths 124, these ultrasonic paths differing with regard to the number of their reflections. In the exemplary embodiment shown in FIG. 4, two ultrasonic paths 124 are illustrated as an example, one having 25 reflections and one having 17 reflections. In this regard, neither of ultrasonic paths 124 is supposed to be significantly dominant over the respective other ultrasonic path 124. Thus, at least two different ultrasonic paths 124 should exist, the sound energy components of which differ from one another by no more than a factor of 10, preferably by no more than a factor of 5 or less. The summed sound energy of these ultrasonic paths 124, for which the mentioned condition of the sound energies applies, preferably of all of these ultrasonic paths for which this condition applies, is preferably at least 50% of the total transmitted sound energy.

The energy components of these different ultrasonic paths 124 may, for example, be determined experimentally, for example by masking out other ultrasonic paths 124, for example with the aid of appropriate filters, masks, or similar elements, and then measuring the transmitted energy. Alternatively or additionally, the energy components may be ascertained empirically or semi-empirically. This may be carried out, for example, in such a way that, based on a known emission characteristic of ultrasonic transducer(s) 116 and/or 118, the components assigned to the particular ultrasonic paths 124 are computed, or ascertained by simulation, for example.

Overall, the ultrasonic waves of ultrasonic paths 124 may constructively or destructively interfere with one another, depending on the sonic distance, so that different modes may be formed, similarly to an optical multimode fiber. As a whole, the effect of this complex superimposition of different components of the emission and reception beams is that the transducer influence is reduced, and an overall more stable and more definitive propagation time measurement is possible. Walls 126 of waveguide 122 thus act as reflective surfaces 120 on which reflection, preferably multiple reflection, may take place. In the illustrated exemplary embodiment, waveguide 122 is preferably symmetrical with respect to ultrasonic flow sensors 110. The fluid medium flows through waveguide 122.

Figure 5:
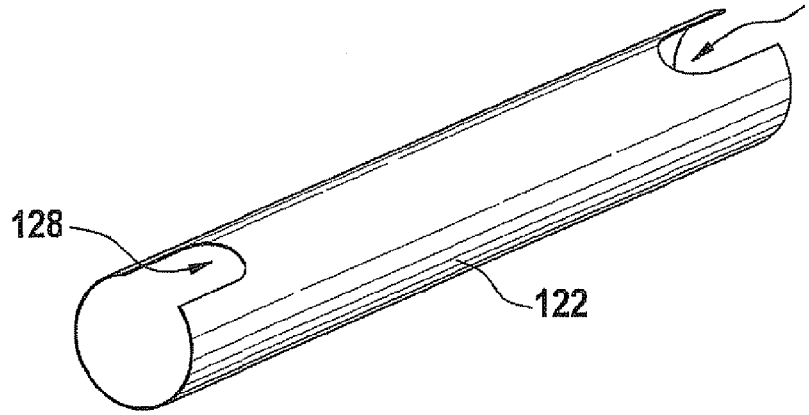
FIG. 5 shows a perspective illustration of a waveguide.

FIG. 5 shows a perspective illustration of one possible embodiment of waveguide 122. Waveguide 122 has openings 128 for an inclined coupling of the ultrasonic signals at an angle with respect to main flow direction 114. These openings 128 may be designed, for example, in the form of cutouts of partial openings for coupling and decoupling the ultrasonic signals. Overall, waveguide 122 may have a channel-like, tubular design.

Figure 6:
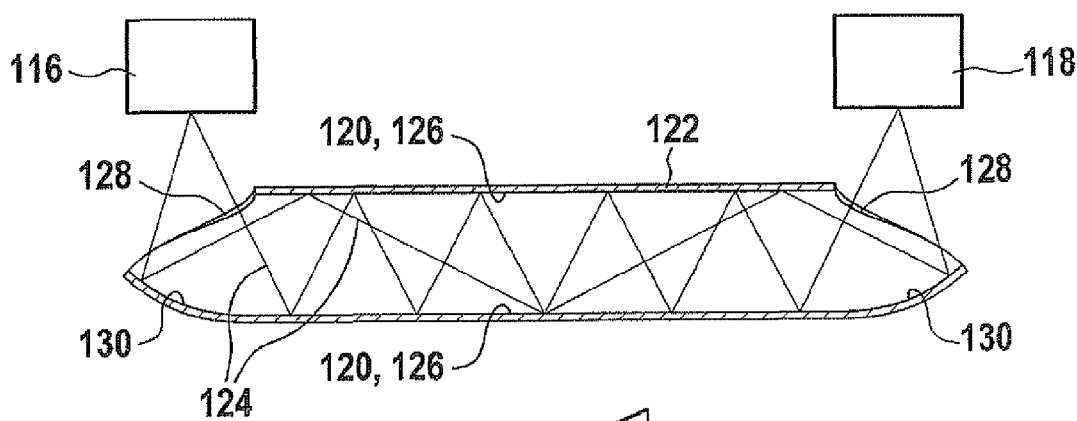
FIG. 6 shows a second exemplary embodiment of an ultrasonic flow sensor according to the present invention.

FIG. 6 shows one embodiment of ultrasonic flow sensor 110 as an alternative to FIG. 4. In this case, once again two ultrasonic paths 124 are illustrated as an example, namely, one ultrasonic path having five reflections and one ultrasonic path having nine reflections. In addition, further ultrasonic paths 124, not illustrated in FIG. 6, may exist.

In the exemplary embodiment in FIG. 6, in the region of the coupling, for example in the region of openings 128, coupling elements 130 may be provided for improving the coupling and decoupling of the ultrasonic signals. For example, these coupling elements 130 may be curved coupling surfaces, as shown in FIG. 6. These coupling elements form supporting reflection geometries at the entry and exit of waveguide 122, which, as shown in FIG. 6, may be curved, for example. However, in principle a different design is possible, for example a design having linear coupling surfaces as coupling elements 130. As a result of the curved design and coupling, for example an installation of ultrasonic transducers 116, 118 flush with the wall is made possible or simplified.

Figure 7:
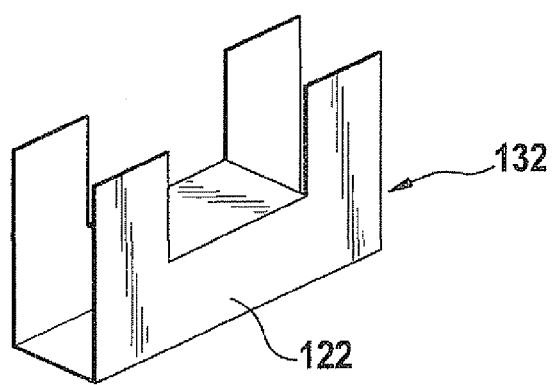
FIG. 7 shows one exemplary embodiment of an ultrasonic flow sensor designed as a plug-in sensor.

FIG. 7 shows one configuration of a waveguide 122 which, for example, may be used as an alternative in ultrasonic flow sensors 110 according to FIG. 4 or 6. In this case, ultrasonic flow sensor 110 or waveguide 122 is designed as a plug-in sensor 132 which may be inserted into flow tube 112 and/or mounted therein. Alternatively, waveguide 122, i.e., the reflection and guide device, may be a part of flow tube 112 or may have a design identical thereto. In particular, the entire flow or a certain portion thereof may flow through waveguide 122. Waveguide 122 may be used to aerodynamically conduct not only the ultrasound but also the flow of the fluid medium, and may similarly have a rectangular, triangular, polygonal, circular, or oval shape, for example.

Figure 8:
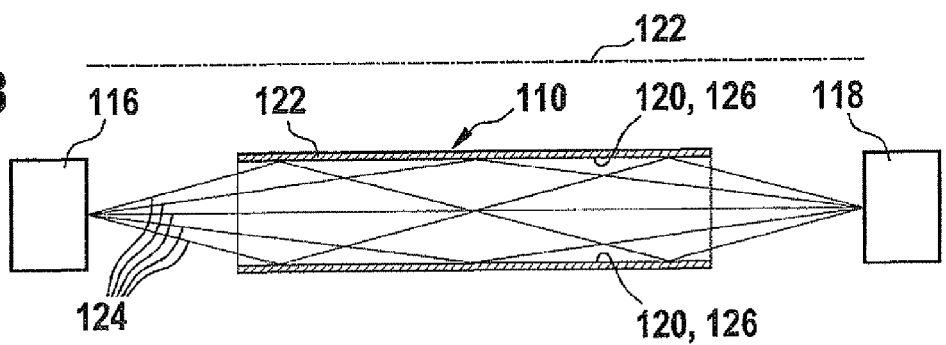
FIG. 8 shows an ultrasonic flow sensor having a linear coupling of the ultrasonic signals into the waveguide.

FIG. 8 once again shows one exemplary embodiment of an ultrasonic flow sensor 110. Ultrasonic transducers 116, 118 are not situated at an angle relative to an axis of waveguide 122, but, rather, are axially symmetrical with respect to waveguide 122 or its longitudinal axis of extension. The same as in the other exemplary embodiments, waveguide 122 may be completely or partially integrated into the flow tube, but may also have a design that is completely or partially different from that of the flow tube, as shown in FIG. 8.

FIG. 8 once again illustrates examples of various ultrasonic paths 124, namely, an ultrasonic path having two reflections, an ultrasonic path having one reflection, and an ultrasonic path in which no reflection takes place.

Figure 9:
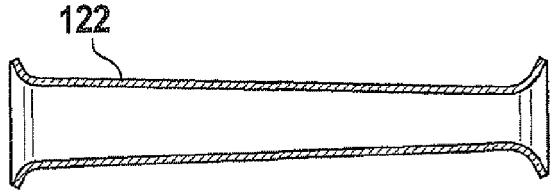
FIGS. 9 and 10 show various longitudinal cross sections of waveguides.
Figure 10:
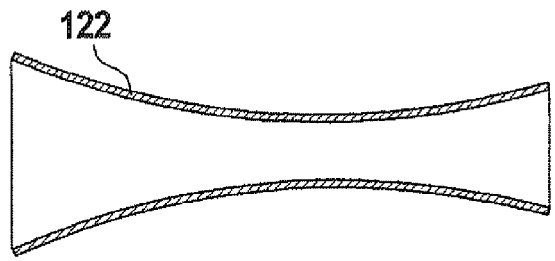
Figure 11:
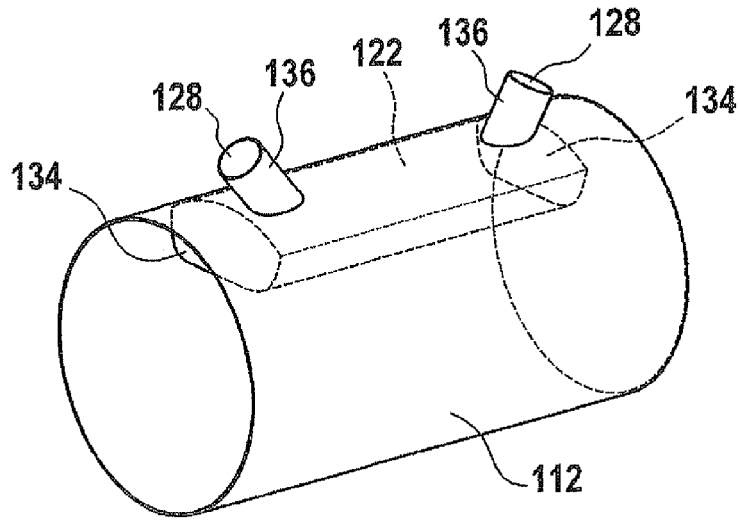
FIG. 11 shows one exemplary embodiment of an ultrasonic flow sensor having a trough-shaped waveguide.
Figure 12A:
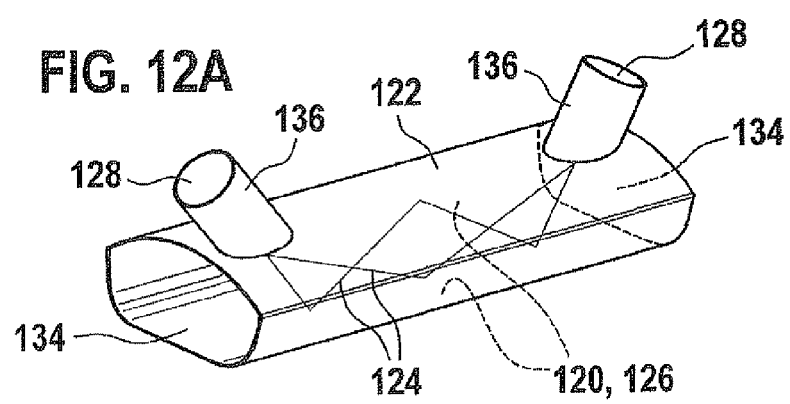
FIGS. 12A and 12B show various illustrations of the trough-shaped waveguide in FIG. 11.
Figure 12B:
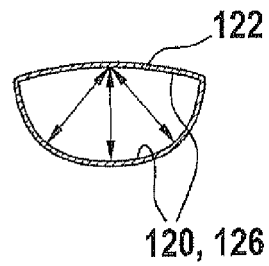

In this exemplary embodiment and in the other exemplary embodiments, waveguide 122 may be rounded at its inlet and outlet openings, and/or may have a conical design, and/or may have a conical or rounded taper and then expand once again. Such possible geometries are illustrated in FIGS. 9 and 10, each of which shows longitudinal sections in parallel to a main flow direction 114. Furthermore, waveguide 122 may have a channel-like, U-shaped, tubular, trough-shaped, or groove-like design. Thus, FIG. 11 shows one exemplary embodiment of a trough-shaped waveguide 122 which is inserted into a flow tube 112, and which has inlet and outlet openings 134 for the fluid medium as well as connectors 136 having openings 128 for the coupling and decoupling of ultrasonic signals. Waveguide 122 is designed as a channel which has an overall trough shape. FIG. 12A shows waveguide 122 in a perspective illustration, while FIG. 12B shows a cross section in a plane perpendicularly to main flow direction 114, in which the trough shape is clearly apparent.

FIGS. 13A through 13D show various alternative cross sections of waveguide 122. The illustration according to FIG. 13A corresponds to the exemplary embodiment according to FIG. 12B, and shows a trough shape. The exemplary embodiments in FIGS. 13B and 13C show U shapes having different widths, and the exemplary embodiment in FIG. 13D shows a grooved shape.

FIGS. 14 and 15 show exemplary embodiments of an ultrasonic flow sensor 110 in which waveguide 122 has at least partially the same design as flow tube 112. An embodiment of this type may be implemented in particular in such a way that ultrasonic transducers 116, 118 are situated in such a way that their axes of symmetry, i.e., main emission axes, extend in main flow direction 114. Walls 126 of flow tube 112 may optionally be curved, and, as optionally shown in FIGS. 14 and 15, may form reflective surfaces 120. As shown in FIG. 14, the flow of the fluid medium may be coupled into flow tube 112 on one side thereof, or, as shown in FIG. 15, on opposite sides of flow tube 112, a section of the flow tube between ultrasonic transducers 116, 118 forming a measuring segment 138. However, as an alternative to the embodiments shown in FIGS. 14 and 15, in which waveguide 122 is completely or partially the same as flow tube 112, waveguide 122 may be situated inside outer flow tube 112 as a separate tube, or merely partially integrated into flow tube 112. Once again alternatively or additionally, waveguide 122 which acts as a reflection and guide device may be completely or partially situated in a bypass 140 of flow tube 112. This is implemented in one exemplary embodiment of an ultrasonic flow sensor 110 shown in FIG. 16. In principle, this system corresponds to the system according to FIG. 14, except that waveguide 122 is not identical to flow tube 112, but, rather, has a bypass 140. This bypass is connected to flow tube 112 via inlet and outlet openings 134 which may also protrude completely or partially into flow tube 112 and form a flow line.

Waveguide 122, which acts as a reflection and guide device, may also be composed of portions of a reflective surface 120 combined with portions of flow tube 112, so that according to the present invention use may be made, for example, of reflections on the reflective surface 120 and also on the wall of flow tube 112.

What is claimed is:

1. An ultrasonic flow sensor for detecting a flow of a fluid medium in a flow tube, comprising:
   at least one first ultrasonic transducer and at least one second ultrasonic transducer; and
   at least one waveguide configured to (i) conduct ultrasonic waves between the at least one first ultrasonic transducer and the at least one second ultrasonic transducer by reflection on walls of the waveguide, and (ii) enable the fluid medium to flow through the waveguide;
   wherein the ultrasonic flow sensor is configured to facilitate the ultrasonic waves to propagate between the first ultrasonic transducer and the second ultrasonic transducer on at least two different ultrasonic paths, the ultrasonic waves being reflected different numbers of times on the at least two different ultrasonic paths, and wherein sound energies of the ultrasonic waves transmitted on the at least two different ultrasonic paths differ from one another by no more than a factor of 100.

2. The ultrasonic flow sensor as recited in claim 1, wherein a combined sound energy of the ultrasonic waves transmitted on the at least two different ultrasonic paths constitute at least 50% of an overall sound energy transmitted between the first ultrasonic transducer and the second ultrasonic transducer.

3. The ultrasonic flow sensor as recited in claim 1, wherein the ultrasonic flow sensor is configured in such a way that a first portion of the fluid medium flows through the waveguide, and at least a second portion of the fluid medium flows outside the waveguide.

4. The ultrasonic flow sensor as recited in claim 3, wherein the ultrasonic flow sensor is at least partially configured as a plug-in sensor.

5. The ultrasonic flow sensor as recited in claim 1, wherein:
   the first and second ultrasonic transducers are configured to at least one of emit and detect wave packets within a specified angular range of primary sound beams;
   the ultrasonic flow sensor is configured in such a way that different transmission functions are associated with sound components within the primary sound beams as a function of an emission angle;
   the waveguide is configured in such a way that the sound components of one of the first and second ultrasonic transducers are deflected to the other one of the ultrasonic transducers; and
   sound components which differ with respect to the emission angle and the transmission function are detected.

6. The ultrasonic flow sensor as recited in claim 1, wherein the first and second ultrasonic transducers are situated essentially symmetrically with respect to the waveguide.

7. The ultrasonic flow sensor as recited in claim 6, wherein the waveguide includes at least one channel section aligned essentially parallel to a main flow direction of the fluid medium.

8. The ultrasonic flow sensor as recited in claim 6, wherein the waveguide includes at least two lateral openings for coupling ultrasonic waves into the waveguide at an angle relative to an axis of the waveguide.

9. The ultrasonic flow sensor as recited in claim 8, wherein the waveguide includes curved coupling elements in the region of the lateral openings for deflecting ultrasonic waves.

10. The ultrasonic flow sensor as recited in claim 8, wherein ultrasonic waves which are coupled into the waveguide are reflected on at least one of the ultrasonic paths in the waveguide at least three times.

11. The ultrasonic flow sensor as recited in claim 8, wherein the waveguide includes at least one curved reflective surface.

12. The ultrasonic flow sensor as recited in claim 8, wherein the ultrasonic transducers are situated in a measuring segment of the flow tube, and wherein the measuring segment includes the waveguide.

13. The ultrasonic flow sensor as recited in claim 8, wherein the waveguide is at least partially accommodated in a bypass of the flow tube.

\* \* \* \* \*